US012181979B2

(12) United States Patent
Reza et al.

(10) Patent No.: US 12,181,979 B2
(45) Date of Patent: Dec. 31, 2024

(54) TWO-PHASE SNAPSHOT RECOVERY

(71) Applicant: Rubrik, Inc., Palo Alto, CA (US)

(72) Inventors: Abdullah Reza, Gilroy, CA (US); Vijay Karthik, Santa Clara, CA (US); Siddharth Bidasaria, Palo Alto, CA (US); Bristy Sikder, Sunnyvale, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 18/344,659

(22) Filed: Jun. 29, 2023

(65) Prior Publication Data

US 2023/0350766 A1 Nov. 2, 2023

Related U.S. Application Data

(63) Continuation of application No. 17/156,754, filed on Jan. 25, 2021, now Pat. No. 11,734,126.

(51) Int. Cl.
| | |
|---|---|
| *G06F 11/14* | (2006.01) |
| *G06F 16/11* | (2019.01) |
| *G06F 16/182* | (2019.01) |
| *H04L 67/06* | (2022.01) |

(52) U.S. Cl.
CPC ...... *G06F 11/1464* (2013.01); *G06F 11/1451* (2013.01); *G06F 11/1469* (2013.01); *G06F 16/128* (2019.01); *G06F 16/1827* (2019.01); *H04L 67/06* (2013.01)

(58) Field of Classification Search
None
See application file for complete search history.

(56) References Cited

U.S. PATENT DOCUMENTS

| | | | |
|---|---|---|---|
| 9,811,532 B2* | 11/2017 | Parkison | G06F 3/0635 |
| 11,086,727 B2 | 8/2021 | Meadowcroft et al. | |
| D939,966 S | 1/2022 | Burmeister et al. | |
| 11,422,838 B2 | 8/2022 | Wang et al. | |
| 11,604,705 B2 | 3/2023 | Mehta et al. | |
| 11,604,762 B2 | 3/2023 | Kuchibhotia et al. | |
| 11,604,806 B2 | 3/2023 | Mankad et al. | |
| 11,609,775 B2 | 3/2023 | Meadowcroft et al. | |
| 11,734,126 B2 | 8/2023 | Reza et al. | |
| 11,899,545 B2* | 2/2024 | Sikder | G06F 11/1464 |
| 11,921,593 B2* | 3/2024 | Reza | G06F 16/13 |
| 2014/0006354 A1* | 1/2014 | Parkison | G06F 3/0635 |
| | | | 707/661 |
| 2014/0006357 A1* | 1/2014 | Davis | G06F 16/182 |
| | | | 707/667 |

(Continued)

*Primary Examiner* — Kim T Nguyen
(74) *Attorney, Agent, or Firm* — Holland & Hart LLP

(57) ABSTRACT

In some examples, a data management and storage (DMS) platform comprises peer DMS nodes in a node cluster, a distributed data store comprising local and cloud storage, and at least one processor configured to perform operations in a method of creating a local consolidated patch file from a patch file chain stored in the cloud storage. Example operations comprise, in a first dry-run phase, creating a patch file image of data blocks in one or more cloud patch files stored in the cloud storage; in a second data-transfer phase, downloading at least some of the data blocks from the cloud patch files identified by the patch file image; and creating and storing, in the local storage, the local consolidated patch file using the downloaded data blocks.

20 Claims, 13 Drawing Sheets

(56) References Cited

U.S. PATENT DOCUMENTS

| | | |
|---|---|---|
| 2020/0019424 A1 | 1/2020 | Wang et al. |
| 2020/0349018 A1 | 11/2020 | Meadowcroft et al. |
| 2021/0342297 A1 | 11/2021 | Gupta et al. |
| 2022/0019555 A1 | 1/2022 | Karthik et al. |
| 2022/0102567 A1 | 3/2022 | Jin et al. |
| 2023/0076277 A1* | 3/2023 | Sikder .................. G06F 16/128 |
| 2023/0350767 A1* | 11/2023 | Reza ..................... G06F 3/0613 |
| 2024/0241798 A1* | 7/2024 | Reza ....................... G06F 16/13 |

* cited by examiner

EXAMPLE METHOD 900

902  IN A FIRST DRY-RUN PHASE, CREATING A PATCH FILE IMAGE OF DATA BLOCKS IN ONE OR MORE CLOUD PATCH FILES STORED IN THE CLOUD STORAGE

FIG. 9

EXAMPLE METHOD 900 (CONT.)

904 IN A SECOND DATA-TRANSFER PHASE, DOWNLOADING AT LEAST SOME OF THE DATA BLOCKS FROM THE CLOUD PATCH FILES IDENTIFIED BY THE PATCH FILE IMAGE

906 CREATING AND STORING, IN THE LOCAL STORAGE, THE LOCAL CONSOLIDATED PATCH FILE USING THE DOWNLOADED DATA BLOCKS

FIG. 10

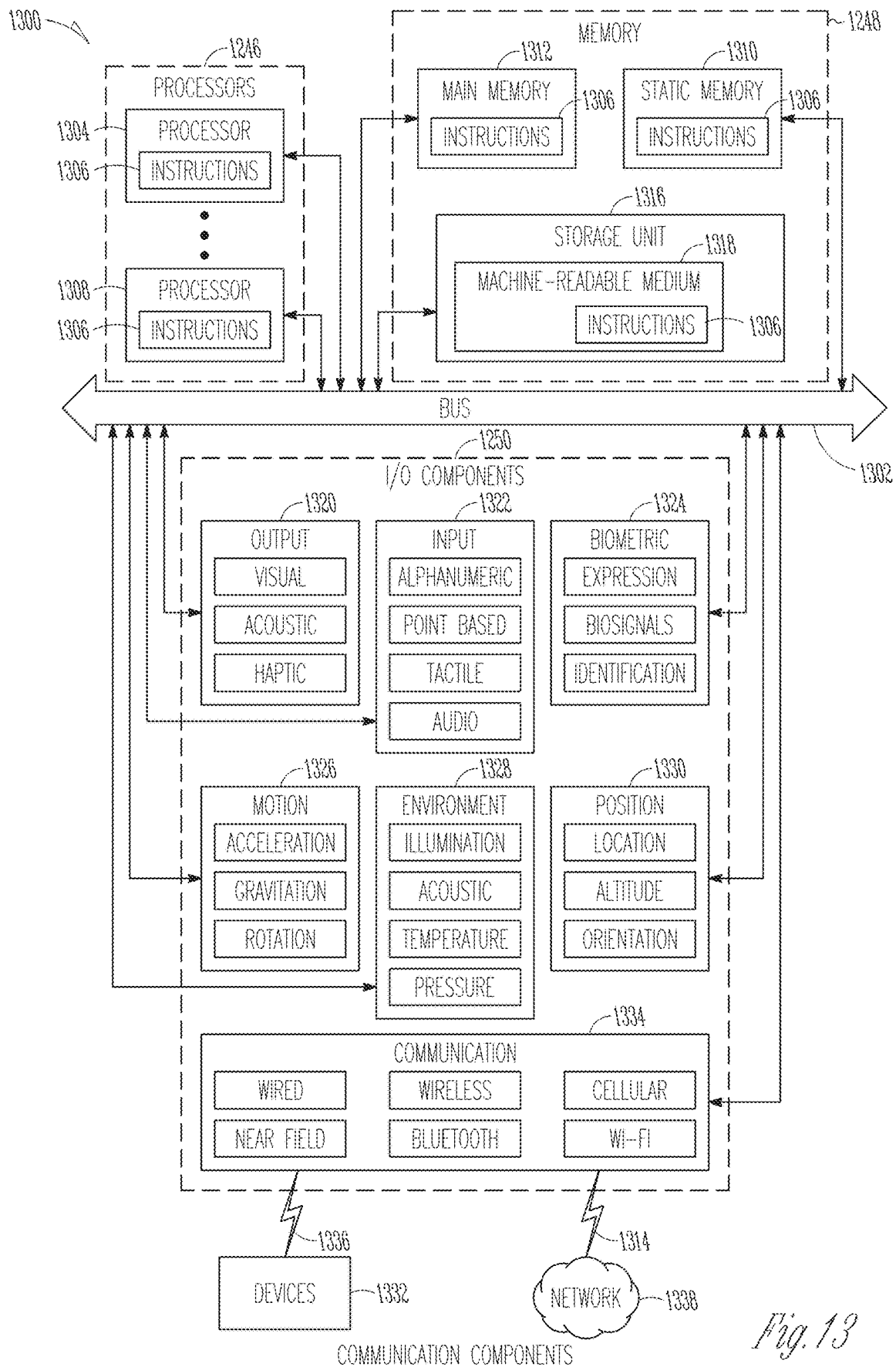

TWO-PHASE SNAPSHOT RECOVERY

CROSS REFERENCE

The present Application for Patent is a Continuation of U.S. patent application Ser. No. 17/156,754 by REZA et al., entitled "TWO-PHASE SNAPSHOT RECOVERY" and filed Jan. 25, 2021, which is assigned to the assignee hereof and expressly incorporated by reference herein.

FIELD

The present disclosure relates generally to computer architecture software for a data management platform. Some examples relate generally to methods and systems for two-phase snapshot recovery. Some examples seek to provide two-phase snapshot recovery from the cloud with smart prefetch and minimal redundant-download features.

BACKGROUND

The volume and complexity of data that is collected, analyzed, and stored is increasing rapidly over time. The computer infrastructure used to handle this data is also becoming more complex, with more processing power and more portability. As a result, data management and storage is becoming increasingly important. Significant issues of these processes include access to reliable data backup and storage and fast data recovery in cases of failure. Other aspects include data portability across locations and platforms.

Virtual machines (VM's) that include virtual disks are sometimes backed up by taking snapshots. In a snapshot-based approach, a base snapshot is taken when a protection policy under a service level agreement (SLA) for example is enabled on a VM and its virtual disks. After the base snapshot is saved on a backup site, incremental snapshots are taken periodically. A delta between two snapshots represents data blocks that have changed, and these blocks may be sent to and stored on a backup site for recovery when needed. Since taking snapshots is an expensive operation and may impact users, snapshots are typically taken some minutes apart, often from the tens of minutes to several hours, and this in turn can result in very poor recovery point objectives (RPOs).

The background description provided herein is to generally present the context of the disclosure. It should be noted that the information described in this section is presented to provide the skilled artisan some context for the following disclosed subject matter and should not be considered as admitted prior art. More specifically, work of the presently named inventors, to the extent it is described in this background section, as well as aspects of the description that may not otherwise qualify as prior art at the time of filing, are neither expressly nor impliedly admitted as prior art against the present disclosure.

SUMMARY

Some general examples disclose a two-phase approach for downloading a snapshot from an off-site data facility or backup site (e.g. the cloud) that seeks to enable maximum throughput with minimum cost by performing large reads from the cloud in parallel. To this end, in a first phase (also known as a "dry-run" phase), some examples build a profile that defines precisely which parts of which source patch file (described further below) should be read, and in what specific order, for a "most effective" download. In a second phase (also known as a data-transfer phase), some examples use this profile to coalesce smaller reads into larger ones and read them from the cloud in parallel. During the second phase, some examples know ahead of time exactly what objects to read which helps a quick read limited to exactly what data is needed for a given snapshot download. That is, some examples do not read any data that would only be discarded later, thereby reducing cost and improving RPOs for system administrators and users.

In some examples, a data management and storage (DMS) platform comprises peer DMS nodes in a node cluster; a distributed data store comprising local and cloud storage; and at least one processor configured to perform operations in a method of creating a local consolidated patch file from a patch file chain stored in the cloud storage, the operations comprising: in a first dry-run phase, creating a patch file image of data blocks in one or more cloud patch files stored in the cloud storage; in a second data-transfer phase, downloading at least some of the data blocks from the cloud patch files identified by the patch file image; and creating and storing, in the local storage, the local consolidated patch file using the downloaded data blocks.

In some examples, the operations further comprise performing a snapshot recovery using the local consolidated patch file.

In some examples, the first dry-run phase further comprises scanning index blocks in the one or more cloud patch files to identify data blocks for downloading in the second data-transfer phase, the patch file image based on the scanning of the index blocks.

In some examples, the patch file image includes one or more tuples, each tuple including values for or information concerning a cloud patch file path, a cloud patch file offset, and a cloud patch file size.

In some examples, the second data-transfer phase further comprises scanning the patch image file created in the first dry-run phase and downloading at least some of the data blocks identified for downloading simultaneously.

In some examples, the second data-transfer phase comprise a coalescing operation to construct larger reads than would occur when read in parallel.

In some examples, a file size of the cloud patch file is in the range 200-300 GB, and a file size of the patch file image is in the range 30-40 MB.

BRIEF DESCRIPTION OF THE DRAWINGS

Some embodiments are illustrated by way of example and not limitation in the views of the accompanying drawing:

FIG. 9 depicts a block flow chart indicating example operations in a method, according to example embodiments.

FIG. 10 depicts a block flow chart indicating example operations in a method, according to example embodiments.

FIG. 13 illustrates a diagrammatic representation of a machine 1000 in the form of a computer system within which a set of instructions may be executed for causing a machine to perform any one or more of the methodologies discussed herein, according to an example embodiment.

DETAILED DESCRIPTION

Figure 1:
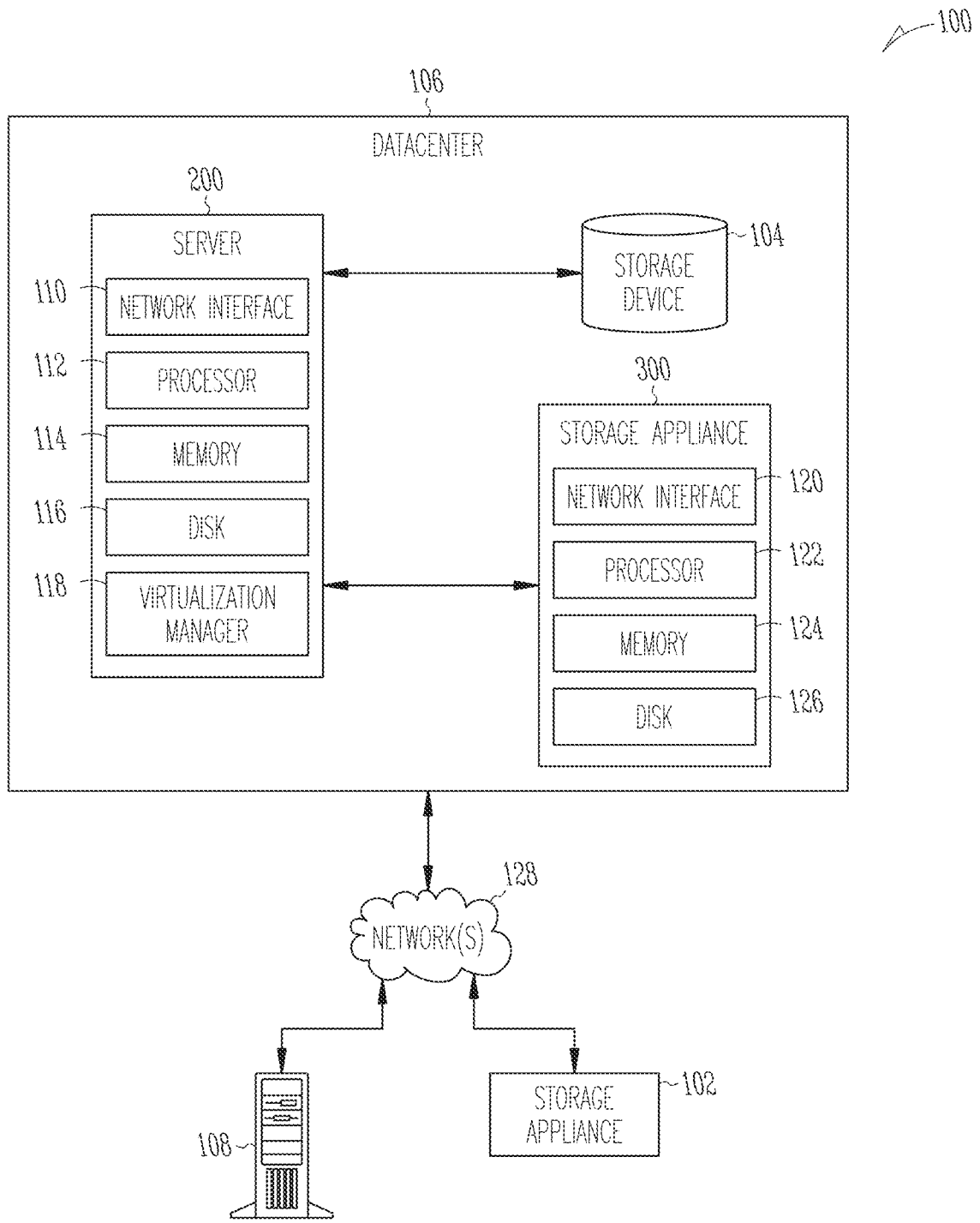
FIG. 1 depicts one embodiment of a networked computing environment in which the disclosed technology may be practiced, according to an example embodiment.

The description that follows includes systems, methods, techniques, instruction sequences, and computing machine program products that embody illustrative embodiments of the present disclosure. In the following description, for purposes of explanation, numerous specific details are set forth in order to provide a thorough understanding of example embodiments. It will be evident, however, to one skilled in the art that the present inventive subject matter may be practiced without these specific details. In this disclosure, the term "snappable" refers to a data object or file that is capable of being copied or backed up, or of which a snapshot can be taken.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Rubrik, Inc., 2020-2021, All Rights Reserved.

It will be appreciated that some of the examples disclosed herein are described in the context of virtual machines that are backed up by using base and incremental snapshots, for example. This should not necessarily be regarded as limiting of the disclosures. The disclosures, systems, and methods described herein apply not only to virtual machines of all types that run a file system (for example), but also to Network Attached Storage (NAS) devices, physical machines (for example Linux servers), and databases.

FIG. 1 depicts one embodiment of a networked computing environment 100 in which the disclosed technology may be practiced. As depicted, the networked computing environment 100 includes a data center 106, a storage appliance 102, and a computing device 108 in communication with each other via one or more networks 128. The networked computing environment 100 may also include a plurality of computing devices interconnected through one or more networks 128. The one or more networks 128 may allow computing devices and/or storage devices to connect to and communicate with other computing devices and/or other storage devices. In some cases, the networked computing environment 100 may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 106 may include one or more servers, such as server 200, in communication with one or more storage devices, such as storage device 104. The one or more servers may also be in communication with one or more storage appliances, such as storage appliance 102. The server 200, storage device 104, and storage appliance 300 may be in communication with each other via a networking fabric connecting servers and data storage units within the data center 106 to each other. The storage appliance 300 may include a data management system for backing up virtual machines and/or files within a virtualized infrastructure. The server 200 may be used to create and manage one or more virtual machines associated with a virtualized infrastructure.

The one or more virtual machines may run various applications, such as a database application or a web server. The storage device 104 may include one or more hardware storage devices for storing data, such as a hard disk drive (HDD), a magnetic tape drive, a solid-state drive (SSD), a storage area network (SAN) storage device, or a NAS device. In some cases, a data center, such as data center 106, may include thousands of servers and/or data storage devices in communication with each other. The one or more data storage devices 104 may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 128 may include a secure network such as an enterprise private network, an unsecure network such as a wireless open network, a local area network (LAN), a wide area network (WAN), and the Internet. The one or more networks 128 may include a cellular network, a mobile network, a wireless network, or a wired network. Each network of the one or more networks 128 may include hubs, bridges, routers, switches, and wired transmission media such as a direct-wired connection. The one or more networks 128 may include an extranet or other private network for securely sharing information or providing controlled access to applications or files.

A server, such as server 200, may allow a client to download information or files (e.g., executable, text, application, audio, image, or video files) from the server 200 or to perform a search query related to particular information stored on the server 200. In some cases, a server may act as an application server or a file server. In general, server 200 may refer to a hardware device that acts as the host in a client-server relationship or a software process that shares a resource with or performs work for one or more clients.

One embodiment of server 200 includes a network interface 110, processor 112, memory 114, disk 116, and virtualization manager 118 all in communication with each other. Network interface 110 allows server 200 to connect to one or more networks 128. Network interface 110 may include a wireless network interface and/or a wired network interface. Processor 112 allows server 200 to execute computer-readable instructions stored in memory 114 in order to perform processes described herein. Processor 112 may include one or more processing units, such as one or more CPUs and/or one or more GPUs. Memory 114 may comprise one or more types of memory (e.g., RAM, SRAM, DRAM, ROM, EEPROM, Flash, etc.). Disk 116 may include a hard disk drive and/or a solid-state drive. Memory 114 and disk 116 may comprise hardware storage devices.

The virtualization manager 118 may manage a virtualized infrastructure and perform management operations associated with the virtualized infrastructure. The virtualization manager 118 may manage the provisioning of virtual machines running within the virtualized infrastructure and provide an interface to computing devices interacting with the virtualized infrastructure. In one example, the virtualization manager 118 may set a virtual machine having a virtual disk into a frozen state in response to a snapshot request made via an application programming interface (API) by a storage appliance, such as storage appliance 300. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 118 may then transfer data associated with the virtual machine (e.g., an image of the virtual machine or a portion of the image of the virtual disk file associated with the state of the virtual disk at the point in time it is frozen) to a storage appliance (for example, a storage appliance 102 or storage appliance 300 of FIG. 1, described further below) in response to a request made by the storage appliance. After the data associated with the point in time snapshot of the virtual machine has been transferred to the storage appliance 300 (for example), the virtual machine may be released from the frozen state (i.e., unfrozen) and the updates made to the virtual machine and stored in the separate file may be merged into the virtual disk file. The virtualization manager 118 may perform various virtual machine-related tasks, such as cloning virtual machines, creating new virtual machines, monitoring the state of virtual machines, moving virtual machines between physical hosts for load balancing purposes, and facilitating backups of virtual machines.

One embodiment of a storage appliance 300 (or storage appliance 102) includes a network interface 120, processor 122, memory 124, and disk 126 all in communication with each other. Network interface 120 allows storage appliance 300 to connect to one or more networks 128. Network interface 120 may include a wireless network interface and/or a wired network interface. Processor 122 allows storage appliance 300 to execute computer readable instructions stored in memory 124 in order to perform processes described herein. Processor 122 may include one or more processing units, such as one or more CPUs and/or one or more GPUs. Memory 124 may comprise one or more types of memory (e.g., RAM, SRAM, DRAM, ROM, EEPROM, NOR Flash, NAND Flash, etc.). Disk 126 may include a hard disk drive and/or a solid-state drive. Memory 124 and disk 126 may comprise hardware storage devices.

In one embodiment, the storage appliance 300 may include four machines. Each of the four machines may include a multi-core CPU, 64 GB of RAM, a 400 GB SSD, three 4 TB HDDs, and a network interface controller. In this case, the four machines may be in communication with the one or more networks 128 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point-in-time versions of the virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 108. The storage appliance 102 may comprise a cloud-based data management system for backing up virtual machines and/or files within a virtualized infrastructure, such as virtual machines running on server 200/or files stored on server 200.

In some cases, networked computing environment 100 may provide remote access to secure applications and files stored within data center 106 from a remote computing device, such as computing device 108. The data center 106 may use an access control application to manage remote access to protected resources, such as protected applications, databases, or files located within the data center 106. To facilitate remote access to secure applications and files, a secure network connection may be established using a virtual private network (VPN). A VPN connection may allow a remote computing device, such as computing device 108, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 300 may manage the extraction and storage of virtual machine snapshots associated with different point in time versions of one or more virtual machines running within the data center 106. A snapshot of a virtual machine may correspond with a state of the virtual machine at a particular point-in-time. In response to a restore command from the storage device 104, the storage appliance 300 may restore a point-in-time version of a virtual machine or restore point-in-time versions of one or more files located on the virtual machine and transmit the restored data to the server 200. In response to a mount command from the server 200, the storage appliance 300 may allow a point-in-time version of a virtual machine to be mounted and allow the server 200 to read and/or modify data associated with the point-in-time version of the virtual machine. To improve storage density, the storage appliance 300 may deduplicate and compress data associated with different versions of a virtual machine and/or deduplicate and compress data associated with different virtual machines. To improve system performance, the storage appliance 300 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 300 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 300 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 300 may run an NFS server and make the particular version (or a copy of the particular version) of the virtual machine accessible for reading and/or writing. The end user of the storage appliance 300 may then select the particular version to be mounted and run an application (e.g., a data analytics application) using the mounted version of the virtual machine. In another example, the particular version may be mounted as an iSCSI target.

Figure 2:
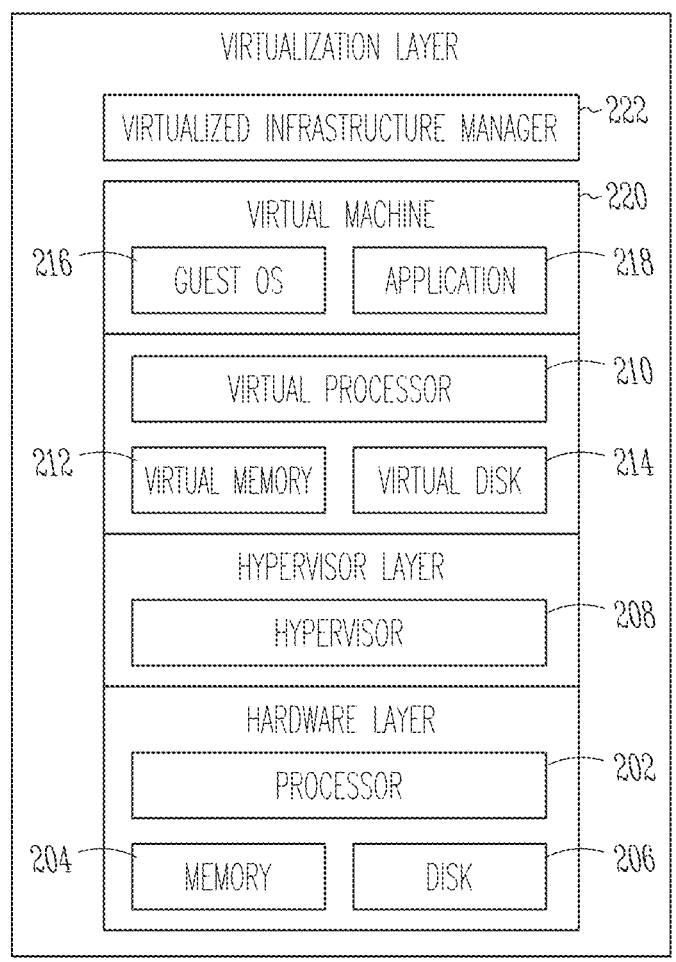
FIG. 2 depicts one embodiment of the server of FIG. 1, according to an example embodiment.

FIG. 2 depicts one embodiment of server 200 of FIG. 1. The server 200 may comprise one server out of a plurality of servers that are networked together within a data center (e.g., data center 106). In one example, the plurality of servers may be positioned within one or more server racks within the data center. As depicted, the server 200 includes hardware-level components and software-level components. The hardware-level components include one or more processors 202, one or more memories 204, and one or more disks 206. The software-level components include a hypervisor 208, a virtualized infrastructure manager 222, and one or more virtual machines, such as virtual machine 220. The hypervisor 208 may comprise a native hypervisor or a hosted hypervisor. The hypervisor 208 may provide a virtual operating platform for running one or more virtual machines, such as virtual machine 220. Virtual machine 220 includes a plurality of virtual hardware devices including a virtual processor 210, a virtual memory 212, and a virtual disk 214. The virtual disk 214 may comprise a file stored within the one or more disks 206. In one example, a virtual machine 220 may include a plurality of virtual disks 214, with each virtual disk of the plurality of virtual disks 214 associated with a different file stored on the one or more disks 206. Virtual machine 220 may include a guest operating system 216 that runs one or more applications, such as application 218.

The virtualized infrastructure manager 222, which may correspond with the virtualization manager 118 in FIG. 1, may run on a virtual machine or natively on the server 200. The virtual machine may, for example, be or include the virtual machine 220 or a virtual machine separate from the server 200. Other arrangements are possible. The virtualized infrastructure manager 222 may provide a centralized platform for managing a virtualized infrastructure that includes a plurality of virtual machines. The virtualized infrastructure manager 222 may manage the provisioning of virtual machines running within the virtualized infrastructure and provide an interface to computing devices interacting with the virtualized infrastructure. The virtualized infrastructure manager 222 may perform various virtualized infrastructure related tasks, such as cloning virtual machines, creating new virtual machines, monitoring the state of virtual machines, and facilitating backups of virtual machines.

In one embodiment, the server 200 may use the virtualized infrastructure manager 222 to facilitate backups for a plurality of virtual machines (e.g., eight different virtual machines) running on the server 200. Each virtual machine running on the server 200 may run its own guest operating system and its own set of applications. Each virtual machine running on the server 200 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 102 in FIG. 1 or storage appliance 300 in FIG. 1, may request a snapshot of a virtual machine running on server 200. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time, and a second snapshot of the virtual machine may correspond with a second state of the virtual machine at a second point in time subsequent to the first point in time.

In response to a request for a snapshot of a virtual machine at a particular point in time, the virtualized infrastructure manager 222 may set the virtual machine into a frozen state or store a copy of the virtual machine at the particular point in time. The virtualized infrastructure manager 222 may then transfer data associated with the virtual machine (e.g., an image of the virtual machine or a portion of the image of the virtual machine) to the storage appliance 300 or storage appliance 102. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 222 may transfer a full image of the virtual machine to the storage appliance 102 or storage appliance 300 of FIG. 1 or a plurality of data blocks corresponding with the full image (e.g., to enable a full image-level backup of the virtual machine to be stored on the storage appliance). In other cases, the virtualized infrastructure manager 222 may transfer a portion of an image of the virtual machine associated with data that has changed since an earlier point in time prior to the particular point in time or since a last snapshot of the virtual machine was taken. In one example, the virtualized infrastructure manager 222 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 222 may output one or more virtual data blocks associated with the virtual machine that have been modified between the first point in time and the second point in time.

In some embodiments, the server 200 or the hypervisor 208 may communicate with a storage appliance, such as storage appliance 102 in FIG. 1 or storage appliance 300 in FIG. 1, using a distributed file system protocol such as NFS Version 3, or Server Message Block (SMB) protocol. The distributed file system protocol may allow the server 200 or the hypervisor 208 to access, read, write, or modify files stored on the storage appliance as if the files were locally stored on the server 200. The distributed file system protocol may allow the server 200 or the hypervisor 208 to mount a directory or a portion of a file system located within the storage appliance.

Figure 3:
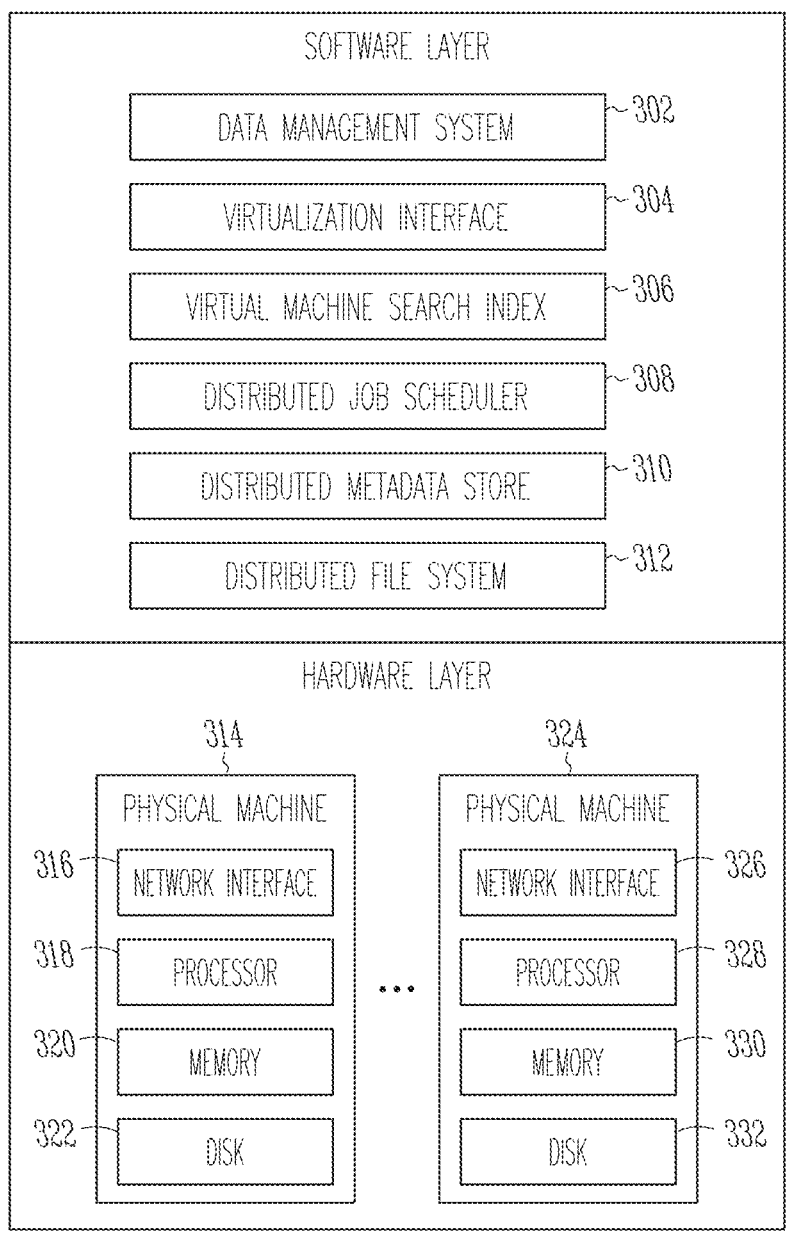
FIG. 3 depicts one embodiment of the storage appliance of FIG. 1, according to an example embodiment.

FIG. 3 depicts one embodiment of storage appliance 300 in FIG. 1. The storage appliance may include a plurality of physical machines that may be grouped together and presented as a single computing system. Each physical machine of the plurality of physical machines may comprise a node in a cluster (e.g., a failover cluster). In one example, the storage appliance may be positioned within a server rack within a data center. As depicted, the storage appliance 300 includes hardware-level components and software-level components. The hardware-level components include one or more physical machines, such as physical machine 314 and physical machine 324. The physical machine 314 includes a network interface 316, processor 318, memory 320, and disk 322 all in communication with each other. Processor 318 allows physical machine 314 to execute computer readable instructions stored in memory 320 to perform processes described herein. Disk 322 may include a hard disk drive and/or a solid-state drive. The physical machine 324 includes a network interface 326, processor 328, memory 330, and disk 332 all in communication with each other. Processor 328 allows physical machine 324 to execute computer readable instructions stored in memory 330 to perform processes described herein. Disk 332 may include a hard disk drive and/or a solid-state drive. In some cases, disk 332 may include a flash-based SSD or a hybrid HDD/SSD drive. In one embodiment, the storage appliance 300 may include a plurality of physical machines arranged in a cluster (e.g., eight machines in a cluster). Each of the plurality of physical machines may include a plurality of multi-core CPUs, 108 GB of RAM, a 500 GB SSD, four 4 TB HDDs, and a network interface controller.

In some embodiments, the plurality of physical machines may be used to implement a cluster-based network file-server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 200 in FIG. 1, or a hypervisor, such as hypervisor 208 in FIG. 2, to communicate with the storage appliance 300 may not provide a failover mechanism (e.g., NFS Version 3). In the case that no failover mechanism is provided on the client side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 208 in FIG. 2, may be configured with a first floating IP address associated with a first node in the cluster. The hypervisor may connect to the cluster using the first floating IP address. In one example, the hypervisor may communicate with the cluster using the NFS Version 3 protocol. Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of nodeG) may be G-i) modulo N. In another example, given a number (N) of nodes in a cluster from node(0) to node(N−1), for a floating IP address (i), the VRRP priority of nodeG) may be (i-j) modulo N. In these cases, nodeG) will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 300 may include data management system 302, a virtualization interface 304, a distributed job scheduler 308, a distributed metadata store 310, a distributed file system 312, and one or more virtual machine search indexes, such as virtual machine search index 306. In one embodiment, the software-level components of the storage appliance 300 may be run using a dedicated hardware-based appliance. In another embodiment, the software-level components of the storage appliance 300 may be run from the cloud (e.g., the software-level components may be installed on a cloud service provider).

In some cases, the data storage across a plurality of nodes in a cluster (e.g., the data storage available from the one or more physical machine (e.g., physical machine 314 and physical machine 324)) may be aggregated and made available over a single file system namespace (e.g., /snapshots/). A directory for each virtual machine protected using the storage appliance 300 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 312 may present itself as a single file system, in which, as new physical machines or nodes are added to the storage appliance 300, the cluster may automatically discover the additional nodes and automatically increase the available capacity of the file system for storing files and other data. Each file stored in the distributed file system 312 may be partitioned into one or more chunks or shards. Each of the one or more chunks may be stored within the distributed file system 312 as a separate file. The files stored within the distributed file system 312 may be replicated or mirrored over a plurality of physical machines, thereby creating a load-balanced and fault tolerant distributed file system. In one example, storage appliance 300 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 310 may include a distributed database management system that provides high availability without a single point of failure. In one embodiment, the distributed metadata store 310 may comprise a database, such as a distributed document-oriented database. The distributed metadata store 310 may be used as a distributed key value storage system. In one example, the distributed metadata store 310 may comprise a distributed NoSQL key value store database. In some cases, the distributed metadata store 310 may include a partitioned row store, in which rows are organized into tables or other collections of related data held within a structured format within the key value store database. A table (or a set of tables) may be used to store metadata information associated with one or more files stored within the distributed file system 312. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 312 and metadata associated with the new file may be stored within the distributed metadata store 310. The distributed metadata store 310 may also be used to store a backup schedule for the virtual machine and a list of snapshots for the virtual machine that are stored using the storage appliance 300.

In some cases, the distributed metadata store 310 may be used to manage one or more versions of a virtual machine. Each version of the virtual machine may correspond with a full image snapshot of the virtual machine stored within the distributed file system 312 or an incremental snapshot of the virtual machine (e.g., a forward incremental or reverse incremental) stored within the distributed file system 312. In one embodiment, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this case, only a single full image needs to be stored, and each version of the virtual machine may be generated from the single full image or the single full image combined with a subset of the one or more incremental aspects. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incremental aspects.

The distributed job scheduler 308 may be used for scheduling backup jobs that acquire and store virtual machine snapshots for one or more virtual machines over time. The distributed job scheduler 308 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 308 may schedule a specific job to be run on a particular node based on data stored on the particular node. For example, the distributed job scheduler 308 may schedule a virtual machine snapshot job to be run on a node in a cluster that is used to store snapshots of the virtual machine in order to reduce network congestion.

The distributed job scheduler 308 may comprise a distributed fault tolerant job scheduler, in which jobs affected by node failures are recovered and rescheduled to be run on available nodes. In one embodiment, the distributed job scheduler 308 may be fully decentralized and implemented without the existence of a master node. The distributed job scheduler 308 may run job scheduling processes on each node in a cluster or on a plurality of nodes in the cluster. In one example, the distributed job scheduler 308 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 310. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 308 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and, in response, may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 308 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks was ever performed. The series of tasks may correspond with an ordering of tasks for the series of tasks and the distributed job scheduler 308 may ensure that each task of the series of tasks is executed based on the ordering of tasks. Tasks that do not have dependencies with each other may be executed in parallel.

In some cases, the distributed job scheduler 308 may schedule each task of a series of tasks to be performed on a specific node in a cluster. In other cases, the distributed job scheduler 308 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 308 may assign one or more tasks associated with a job to be executed on a particular node in a cluster based on the location of data that may be required to be accessed by the one or more tasks.

In one embodiment, the distributed job scheduler 308 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 222 in FIG. 2, to create a frozen copy of the virtual machine and to transfer one or more chunks (or one or more files) associated with the frozen copy to a storage appliance, such as storage appliance 300 in FIG. 1. The one or more tasks may also include generating metadata for the one or more chunks, storing the metadata using the distributed metadata store 310, storing the one or more chunks within the distributed file system 312, and communicating with the virtualized infrastructure manager 222 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 312 (e.g., the first chunk is located at /snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 304 may provide an interface for communicating with a virtualized infrastructure manager managing a virtualization infrastructure, such as virtualized infrastructure manager 222 in FIG. 2, and requesting data associated with virtual machine snapshots from the virtualization infrastructure. The virtualization interface 304 may communicate with the virtualized infrastructure manager using an Application Programming Interface (API) for accessing the virtualized infrastructure manager (e.g., to communicate a request for a snapshot of a virtual machine). In this case, storage appliance 300 may request and receive data from a virtualized infrastructure without requiring agent software to be installed or running on virtual machines within the virtualized infrastructure. The virtualization interface 304 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 306 may include a list of files that have been stored using a virtual machine and a version history for each of the files in the list. Each version of a file may be mapped to the earliest point-in-time snapshot of the virtual machine that includes the version of the file or to a snapshot of the virtual machine that includes the version of the file (e.g., the latest point in time snapshot of the virtual machine that includes the version of the file). In one example, the virtual machine search index 306 may be used to identify a version of the virtual machine that includes a particular version of a file (e.g., a particular version of a database, a spreadsheet, or a word processing document). In some cases, each of the virtual machines that are backed up or protected using storage appliance 300 may have a corresponding virtual machine search index.

In one embodiment, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 312 in FIG. 3.

The data management system 302 may comprise an application running on the storage appliance 300 that manages and stores one or more snapshots of a virtual machine. In one example, the data management system 302 may comprise a highest-level layer in an integrated software stack running on the storage appliance. The integrated software stack may include the data management system 302, the virtualization interface 304, the distributed job scheduler 308, the distributed metadata store 310, and the distributed file system 312.

In some cases, the integrated software stack may run on other computing devices, such as a server or computing device 108 in FIG. 1. The data management system 302 may use the virtualization interface 304, the distributed job scheduler 308, the distributed metadata store 310, and the distributed file system 312 to manage and store one or more snapshots of a virtual machine. Each snapshot of the virtual machine may correspond with a point-in-time version of the virtual machine. The data management system 302 may generate and manage a list of versions for the virtual machine. Each version of the virtual machine may map to or reference one or more chunks and/or one or more files stored within the distributed file system 312. Combined together, the one or more chunks and/or the one or more files stored within the distributed file system 312 may comprise a full image of the version of the virtual machine.

Figure 4:
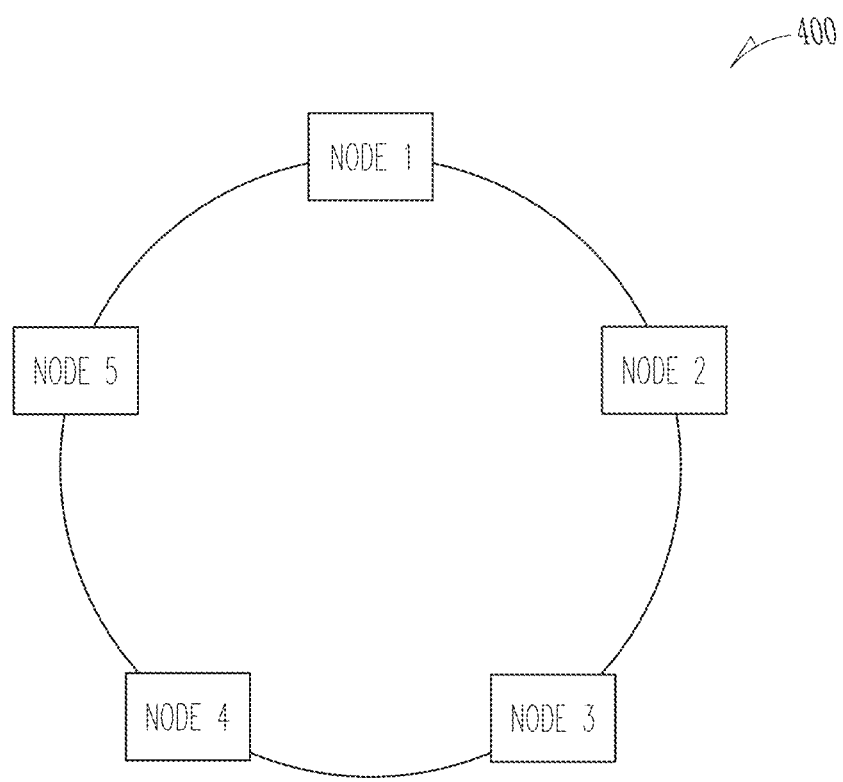
FIG. 4 shows an example cluster of a distributed decentralized database, according to some example embodiments.

FIG. 4 shows an example cluster 400 of a distributed decentralized database, according to some example embodiments. As illustrated, the example cluster 400 includes five nodes, nodes 1-5. In some example embodiments, each of the five nodes runs from different machines, such as physical machine 314 in FIG. 3 or virtual machine 220 in FIG. 2. The nodes in the example cluster 400 can include instances of peer nodes of a distributed database (e.g., cluster-based database, distributed decentralized database management system, a NoSQL database, Apache Cassandra, DataStax, MongoDB, CouchDB), according to some example embodiments. The distributed database system is distributed in data is sharded or distributed across the example cluster 400 in shards or chunks and decentralized in that there is no central storage device and no single point of failure. The system operates under an assumption that multiple nodes may go down, up, or become non-responsive, and so on. Sharding is splitting up of the data horizontally and managing each shard separately on different nodes. For example, if the data managed by the example cluster 400 can be indexed using the 26 letters of the alphabet, node 1 can manage a first shard that handles records that start with A through E, node 2 can manage a second shard that handles records that start with F through J, and so on.

In some example embodiments, data written to one of the nodes is replicated to one or more other nodes per a replication protocol of the example cluster 400. For example, data written to node 1 can be replicated to nodes 2 and 3. If node 1 prematurely terminates, node 2 and/or 3 can be used to provide the replicated data. In some example embodiments, each node of example cluster 400 frequently exchanges state information about itself and other nodes across the example cluster 400 using gossip protocol. Gossip protocol is a peer-to-peer communication protocol in which each node randomly shares (e.g., communicates, requests, transmits) location and state information about the other nodes in a given cluster.

Writing: For a given node, a sequentially written commit log captures the write activity to ensure data durability. The data is then written to an in-memory structure (e.g., a memtable, write-back cache). Each time the in-memory structure is full, the data is written to disk in a Sorted String Table data file. In some example embodiments, writes are automatically partitioned and replicated throughout the example cluster 400.

Reading: Any node of example cluster 400 can receive a read request (e.g., query) from an external client. If the node that receives the read request manages the data requested, the node provides the requested data. If the node does not manage the data, the node determines which node manages the requested data. The node that received the read request then acts as a proxy between the requesting entity and the node that manages the data (e.g., the node that manages the data sends the data to the proxy node, which then provides the data to an external entity that generated the request).

The distributed decentralized database system is decentralized in that there is no single point of failure due to the nodes being symmetrical and seamlessly replaceable. For example, whereas conventional distributed data implementations have nodes with different functions (e.g., master/slave nodes, asymmetrical database nodes, federated databases), the nodes of example cluster 400 are configured to function the same way (e.g., as symmetrical peer database nodes that communicate via gossip protocol, such as Cassandra nodes) with no single point of failure. If one of the nodes in example cluster 400 terminates prematurely ("goes down"), another node can rapidly take the place of the terminated node without disrupting service. The example cluster 400 can be a container for a keyspace, which is a container for data in the distributed decentralized database system (e.g., whereas a database is a container for containers in conventional relational databases, the Cassandra keyspace is a container for a Cassandra database system).

In some examples, a data management platform or backup service archives a snapshot in the cloud (e.g. S3, Azure) for long-term retention. Each snapshot is stored as a sparse file known as patch file. When a user wants to restore the snapshot from cloud to a local server, a consolidated patch file is created locally by reading pieces from various patch files in the cloud. Each patch file in the cloud represents one snapshot. The logical view of the snapshot to be downloaded is given by the entire chain of patch files across all snapshots leading up to the to-be-downloaded snapshot. One challenge is that reading small segments of data from various patch files from the cloud is slow. Cloud reads have high latency. Most commercially available cloud services offer better overall throughput if larger reads are issued. In addition, some cloud services charge clients on the number of reads issued. Hence, being able to read in larger chunks gives better throughput at lower cost. Further, most cloud providers have the property that maximum throughput is achieved if multiple reads are issued in parallel.

In this disclosure, some examples employ a two-phase approach to download a snapshot from the cloud that seeks to achieve maximum throughput with minimum cost by performing large reads from the cloud in parallel. To this end, in a first phase (also known as a "dry-run" phase), some examples build a profile that defines precisely which parts of which source patch file (described further below) should be read, and in what specific order, for a "most effective" download. In a second phase (also known as a data-transfer phase), some examples use this profile to coalesce smaller reads into larger ones and read them from the cloud in parallel. During the second phase, some examples know ahead of time exactly what objects to read which helps a quick read limited to exactly what data is needed for a given snapshot download. That is, some examples do not read any data that would only be discarded later, thereby reducing cost and improving RPOs for system administrators and users.

Figure 5:
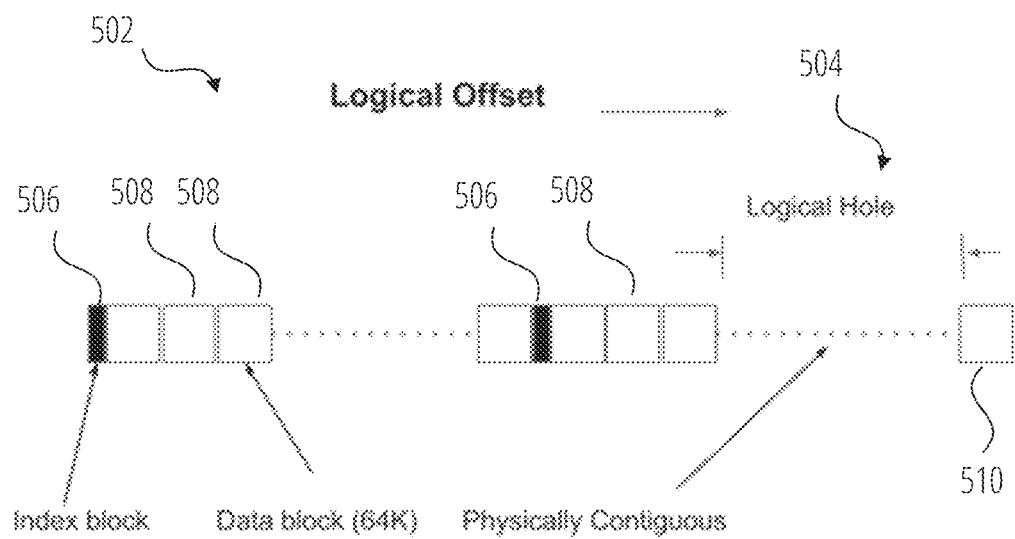
FIG. 5 shows how an example patch file is laid out on a disk, according to an example embodiment.

Some example systems and methods use a sparse representation to store data for a snapshot. This sparse representation may be called a patch file. This file only stores data blocks (typically 64 KB in size) that have changed since a previous snapshot. A logical view of a snapshot is given by all the patch files, in order, from all prior snapshots up to the snapshot in question. FIG. 5 shows how an example patch file 502 is laid out on a disk. Logically, the patch file 502 is a key-value store where the key is the logical offset of the data and the value is a 64 KB data block (except for the very last block 510 which can be smaller). A patch file for a snapshot only contains keys (logical offsets) for data blocks that have changed since the last snapshot was taken. This is why we may have "logical holes" 504 as shown in FIG. 5. Some examples include a special index block 506 for a group of data blocks 508, for example. These index blocks 506 are very small compared to the data blocks 508 (approximately a 200 KB index block can index 1 GB of actual data blocks) and allows some example embodiments to locate data blocks 508 quickly without scanning the entire file (that is, these index blocks 506 facilitate key-value lookup scheme). An index block 506 representing a set of data blocks 508 can be placed either before the data blocks 508 or after the data blocks 508 (depending on implementation).

In some examples, each snapshot stored in the cloud is represented by one patch file. When a user wants to download (i.e. recover) a particular snapshot, examples review (identify) all patch files up to and including the to-be-downloaded snapshot and download relevant blocks from the cloud in order to create a local patch file which represents a consolidated view of all those cloud patch files.

Figure 6:
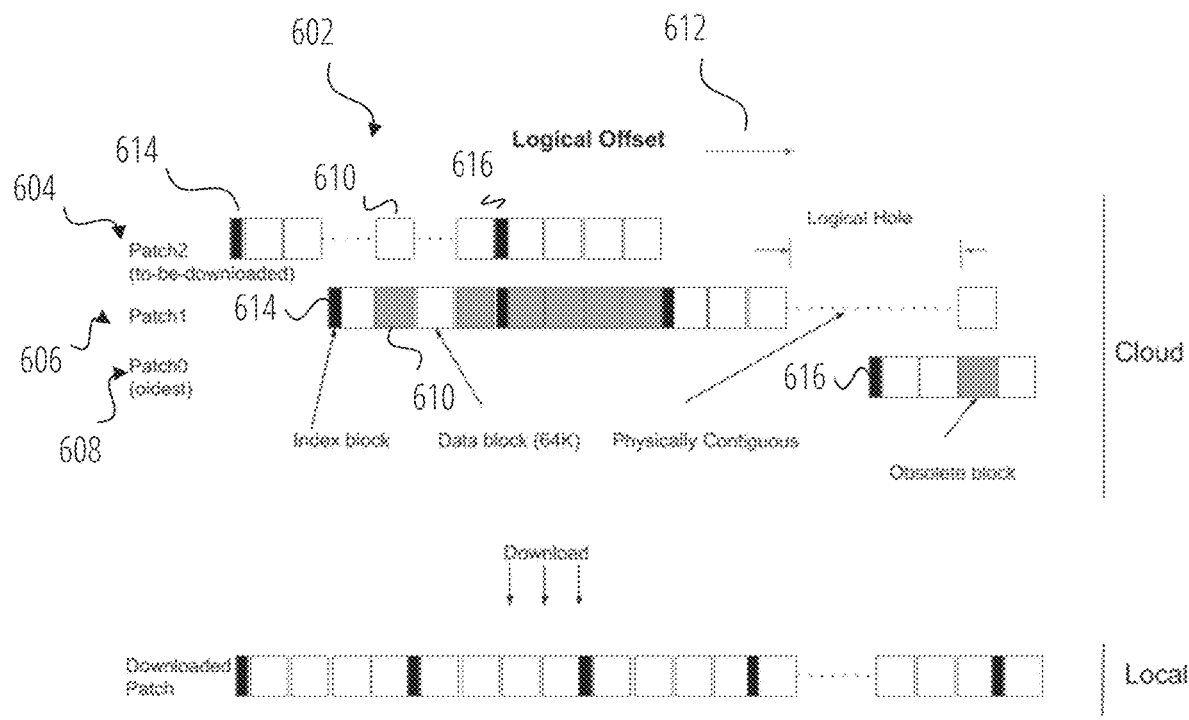
FIG. 6 shows an example download mechanism, according to an example embodiment.

FIG. 6 shows an example download mechanism 602 in which an example patch file 604 (represented by Patch2) is downloaded from the cloud to a local server. In some embodiments, the download mechanism 602 may be a software-level component of a storage appliance in a data center in a networked computing environment, such as the networked computing environment 100 in FIG. 1. In some embodiments, the download mechanism 602 may be integrated into a data management system for managing virtual machines and data backups in a storage appliance, for example a storage appliance described above.

Referring again to FIG. 6, Patch2 is dependent on two previous snapshots 606 and 608 in the cloud (Patch1 and Patch0). For a local recovery, a local patch file is downloaded locally. In some examples, the local patch file includes a consolidated version of the three patch files 604, 606, and 608. For a particular logical offset, the same data block 610 can exist in more than one patch file. In such cases, some examples download the relevant block (here data block 610) from the newest patch file. In FIG. 6, all blocks to be downloaded locally are colored white and the blocks that are to be discarded (since a block at the same offset exists in a newer patch) file are colored gray. The blocks 610 are colored accordingly, as an example.

Some example embodiments iterate the index blocks of all patch files from start to finish in the order of logical offset shown by the arrow 612 in FIG. 6. The index blocks 616 contain information that indicates which data blocks (form example, data block 610) should be downloaded and which data blocks can be discarded. If a data block is identified for downloading, it is downloaded and added to the local patch file at the same logical offset.

In some example embodiments, this approach may have some drawbacks. For example, these embodiments can invoke multiple 64 KB reads at a time. Cloud reads have high latency and smaller reads suffer more. Some testing has revealed for example that reads of size 8 MB or more provide the best latency and throughput results. This may vary to some degree based on vendor and connection, but 64 KB reads are too small. Indeed, in some instances, smaller reads are not only slower but they are also costlier (most cloud vendors charge per read request). Another drawback relates to issuing 64 KB reads serially one at a time. To maximize throughput, most cloud vendors require parallel issuance of reads.

One approach for addressing these challenges includes issuing larger reads for the next sequential offsets of a particular file and hope that the next data blocks needed from this file can be satisfied from cached reads. This approach can be augmented with parallel prefetching of future sequential offsets to achieve parallelism. The problem with these approaches is that they may still cause downloading of redundant data from the cloud that will eventually be discarded, incurring higher costs for users. Moreover, it is possible that these approaches do not download the correct or required data blocks thus hindering or even preventing maximum throughout. A problem remains in that the correct, future data blocks that need to be downloaded for a full (consolidated) local patch file are not identified ahead of time.

For example, returning to FIG. 6, if we look at Patch1 (file 606) in the cloud, most of its data blocks are to be discarded (colored gray as redundant), hence they should not be downloaded. As the Patch1 file 606 is scanned from left to right to perform cloud reads, the potential solutions do not know whether the future data blocks (i.e. further to the right) will be relevant or redundant until they have finished scanning the entire file.

In sum, a significant problem presented by conventional approaches is that as the next 64 KB data block is read from a particular file in the cloud, it is still not known which future offsets from the same file will be read. A potential solution includes reading only 64 KB blocks (small reads) but this suffers from the drawbacks discussed above, while another potential solution prevents issuing future reads asynchronously in parallel ahead in time to achieve better throughput.

Some present example embodiments of this disclosure address these and other challenges by including two-phase approach for cloud reads and, in some examples, provide systems and methods for two-phase snapshot recovery.

Figure 7:
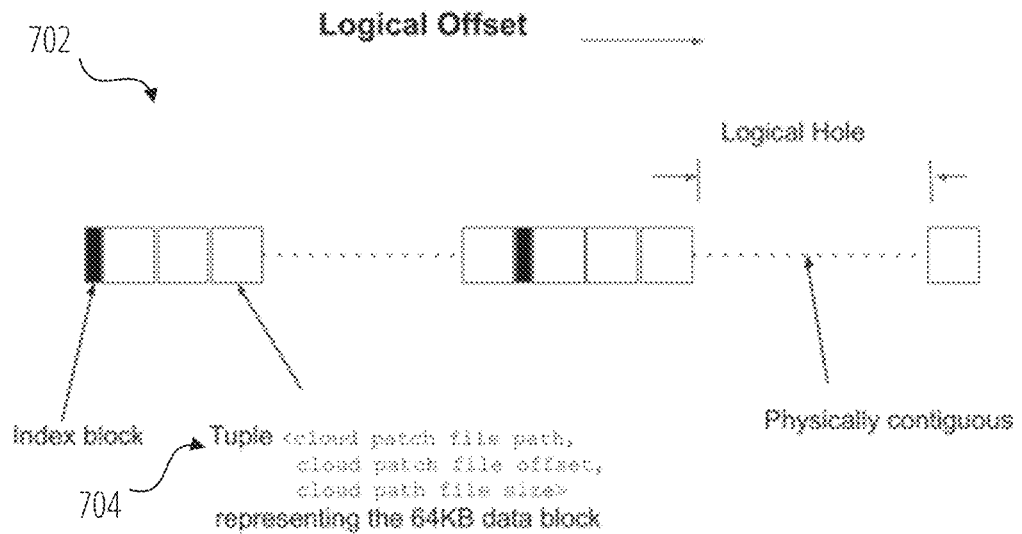
FIG. 7 shows a patch file image, according to an example embodiment.

Some embodiments include a Phase-1 in a two-phase method of snapshot recovery. This phase may also be called a dry-run phase (for example phase 802 in FIG. 8, described in more detail below). In this phase, some embodiments scan the index blocks of the cloud patch files and identify which data blocks from which cloud files need to be read to create a local consolidated patch file (for example, 806 in FIG. 8). Instead of reading the data blocks themselves, this block identification information is stored in a new file format called a "patch file image". An example of a patch file image 702 is shown in FIG. 7. Other examples are possible.

Some embodiments include a Phase-2 in a two-phase method of snapshot recovery. This phase may also be called a data-transfer phase (for example phase 804 in FIG. 8, described in more detail below). In this phase, some embodiments scan the patch file image previously created in the dry-run phase from start to finish and issue larger reads in parallel ahead of time to address the cloud reads and redundancy problems discussed above. Examples of a two-phase approach seek to achieve maximum data throughput possible without causing a downloading of redundant data. In adopting a two-phase approach, such examples are pre-informed or instructed by a full set of future reads for downloading and creating a complete local patch file based on the patch file image built in the previous dry-run phase.

With reference to the example patch file image 702 of FIG. 7, in some aspects this image or format is similar to the real patch file that it represents, except that, in some examples, instead of storing actual 64 KB data blocks, each block of the patch file image 702 stores a tuple 704. An example tuple 704 includes values for or information concerning a cloud patch file path, a cloud patch file offset, and a cloud patch file size identifying which cloud patch file and which location within the file the real data should be downloaded from.

In some examples, the file size of the patch file image is very small compared to the actual patch file since it does not store actual data. For example, a patch file image of a patch file in the range of 200-300 GB in size may be in the range 30-40 MB, and in one example the patch file is 230 GB and the patch file image is 37 MB. This enables storage of the intermediate patch file images file in fast media (e.g. SSD) to minimize or even avoid the cost of more expensive slow media (HDD) writes and reads. It should be noted that building a patch file image involves reading index blocks from the cloud patch files but avoids reading data blocks from cloud patch files. Index blocks are very small compared to the actual data blocks (for example, one index block of 200 KB covers up to 1 GB of read data).

Figure 8:
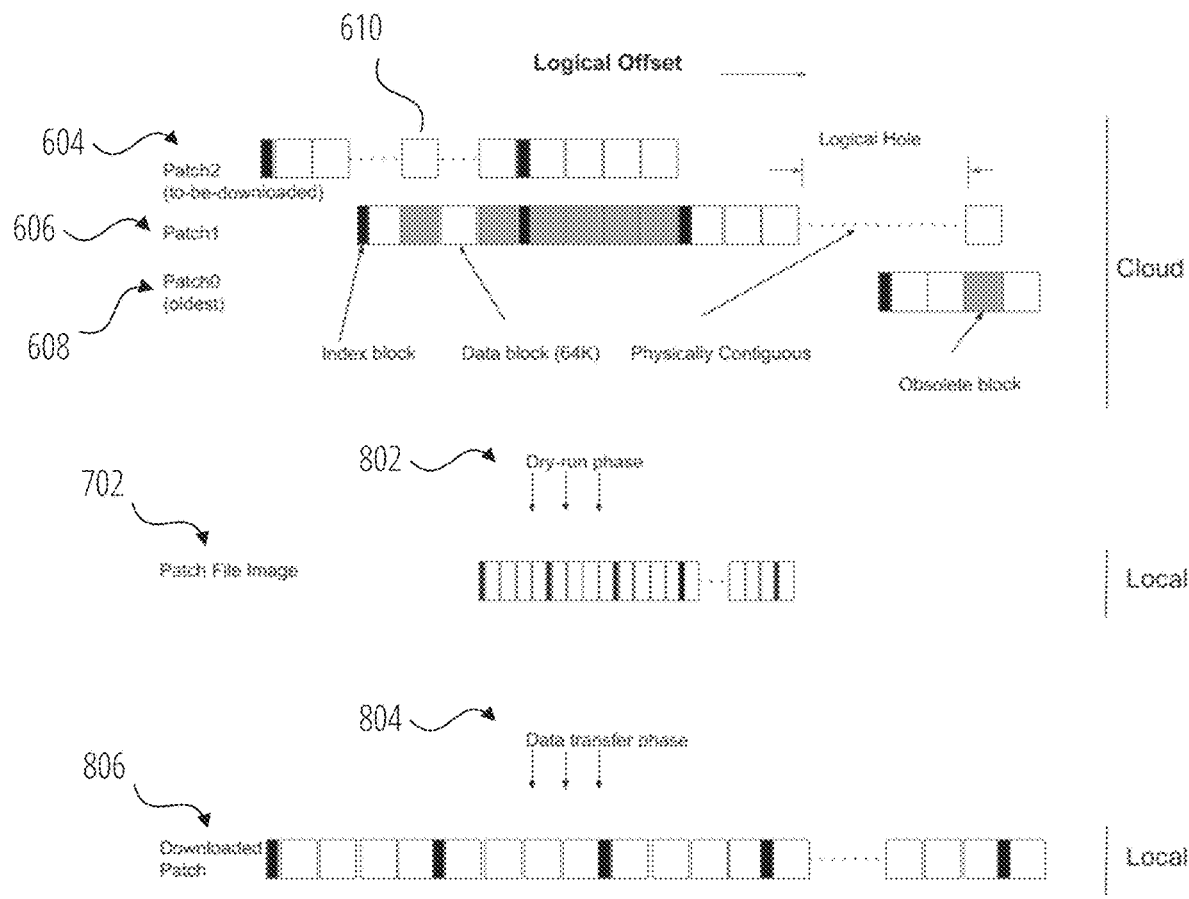
FIG. 8 shows aspects of a two-phase method of snapshot recovery, according to example embodiments.

With reference to FIG. 8, in a data-transfer phase 804, some embodiments scan a patch file image 702 from start to finish, read the data blocks (for example, data block 610 and others) in larger chunks and in parallel to maximize throughput and minimize latency. Example embodiments perform smart coalescing using the previously obtained information of future reads (derived from the patch file image) so that larger chunks from the same file are read in parallel. Coalescing here refers to a mechanism whereby contiguous blocks of data from the same patch file in the cloud are merged into larger reads. If data is so fragmented across patch files that coalescing fails to create larger chunks, some embodiments can still leverage parallel future reads with a large number of threads to maximize throughput. In some embodiments, this can all be done without downloading any redundant data from the cloud. In some examples, the coalescing mechanism permits a certain degree of data wastage if that results in overall larger read sizes on average (this is configurable). In some examples, the two-phase approach disclosed herein enables saturation of the available read bandwidth to the cloud (for example in S3, Azure or others).

With reference to FIGS. 9-10, certain operations in a method of two-phase snapshot recovery are shown for a data management and storage (DMS) platform accessing a cluster comprising peer DMS nodes and a distributed data store comprising local and cloud storage. With reference to FIG. 9, a method 900 of creating a local consolidated patch file from a patch file chain stored in the cloud storage, comprises: in operation 902, in a first dry-run phase, creating a patch file image of data blocks in one or more cloud patch files stored in the cloud storage. With reference to FIG. 10, the method 900 may further comprise, at operation 904, in a second data-transfer phase, downloading at least some of the data blocks from the cloud patch files identified by the patch file image; and, in operation 906, creating and storing, in the local storage, the local consolidated patch file using the downloaded data blocks.

In some examples, the method 900 further comprises performing a snapshot recovery using the local consolidated patch file.

In some examples, the first dry-run phase further comprises scanning index blocks in the one or more cloud patch files to identify data blocks for downloading in the second data-transfer phase, the patch file image based on the scanning of the index blocks.

In some examples, the patch file image includes one or more tuples, each tuple including values for or information concerning a cloud patch file path, a cloud patch file offset, and a cloud patch file size.

In some examples, the second data-transfer phase further comprises scanning the patch image file created in the first dry-run phase and downloading at least some of the data blocks identified for downloading simultaneously.

In some examples, the second data-transfer phase comprise a coalescing operation to construct larger reads than would occur when read in parallel.

In some examples, a file size of the cloud patch file is in the range 200-300 GB, and a file size of the patch file image is in the range 30-40 MB.

Figure 11:
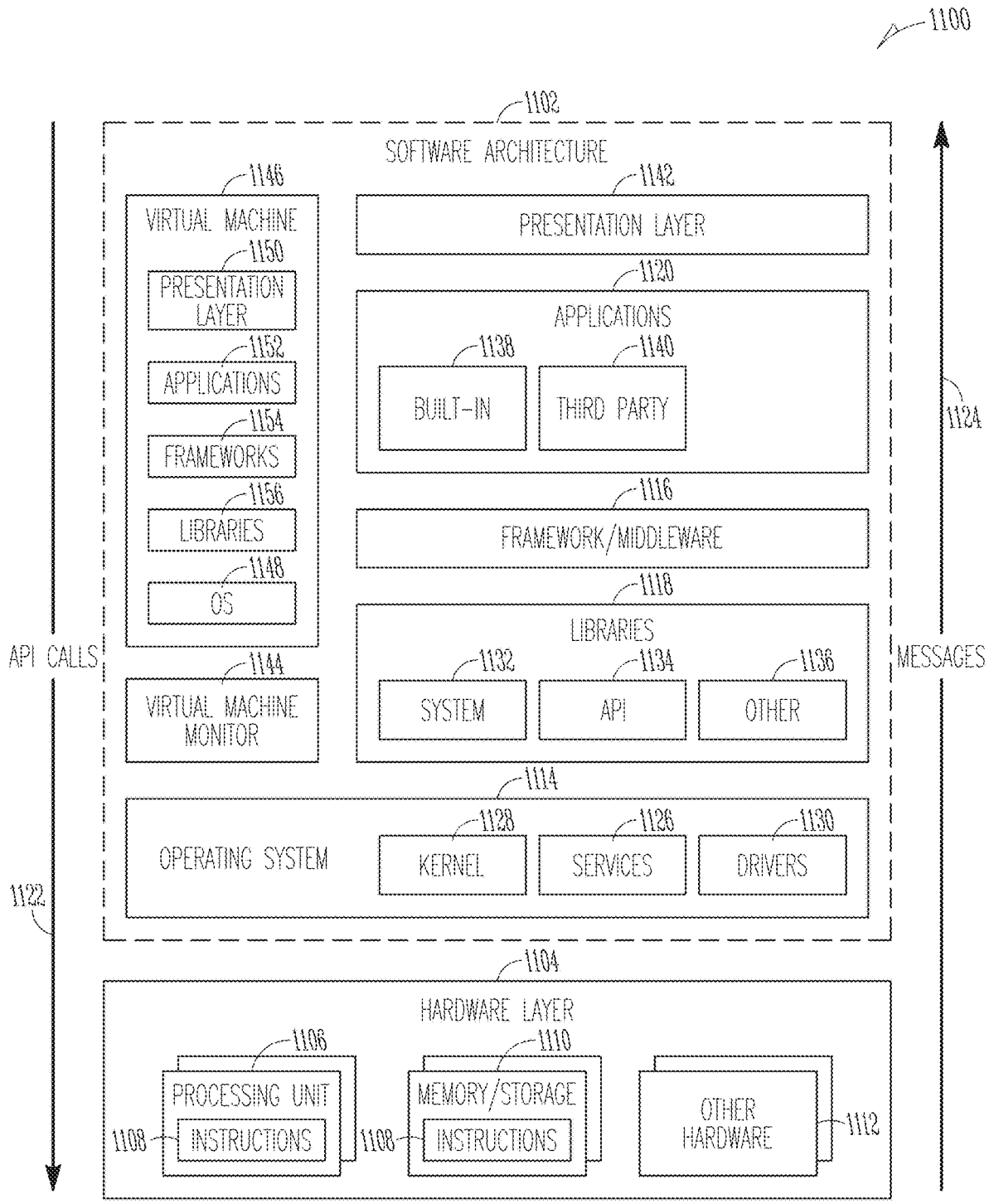
FIG. 11 depicts a block diagram illustrating an example of a software architecture that may be installed on a machine, according to some example embodiments.

FIG. 11 is a block diagram illustrating an example of a computer software architecture for data classification and information security that may be installed on a machine, according to some example embodiments. FIG. 11 is merely a non-limiting example of a software architecture 1102, and it will be appreciated that many other architectures may be implemented to facilitate the functionality described herein. The software architecture 1102 may be executing on hardware such as a machine 1300 of FIG. 13 that includes, among other things, processor 1246, memory 1248, and I/O components 1250. A representative hardware layer 1104 of FIG. 11 is illustrated and can represent, for example, the machine 1300 of FIG. 13. The representative hardware layer 1104 of FIG. 11 comprises one or more processing units 1106 having associated executable instructions 1108. The executable instructions 1108 represent the executable instructions of the software architecture 1102, including implementation of the methods, modules, and so forth described herein. The representative hardware layer 1104 also includes memory or storage modules 1110, which also have the executable instructions 1108. The representative hardware layer 1104 may also comprise other hardware 1112, which represents any other hardware of the representative hardware layer 1104, such as the other hardware illustrated as part of the machine 1100.

In the example architecture of FIG. 11, the software architecture 1102 may be conceptualized as a stack of layers, where each layer provides particular functionality. For example, the software architecture 1102 may include layers such as an operating system 1114, libraries 1118, frameworks/middleware 1116, applications 1120, and a presentation layer 1142. Operationally, the applications 1120 or other components within the layers may invoke API calls 1122 through the software stack and receive a response, returned values, and so forth (illustrated as messages 1124) in response to the API calls 1122. The layers illustrated are representative in nature, and not all software architectures have all layers. For example, some mobile or special purpose operating systems may not provide a frameworks/middleware 1116 layer, while others may provide such a layer. Other software architectures may include additional or different layers.

The operating system 1114 may manage hardware resources and provide common services. The operating system 1114 may include, for example, a kernel 1128, services 1126, and drivers 1130. The kernel 1128 may act as an abstraction layer between the hardware and the other software layers. For example, the kernel 1128 may be responsible for memory management, processor management (e.g., scheduling), component management, networking, security settings, and so on. The services 1126 may provide other common services for the other software layers. The drivers 1130 may be responsible for controlling or interfacing with the underlying hardware. For instance, the drivers 1130 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1118 may provide a common infrastructure that may be utilized by the applications 1120 and/or other components and/or layers. The libraries 1118 typically provide functionality that allows other software modules to perform tasks in an easier fashion than by interfacing directly with the underlying operating system 1114 functionality (e.g., kernel 1128, services 1126, or drivers 1130). The libraries 1118 may include system libraries 1132 (e.g., C standard library) that may provide functions such as memory allocation functions, string manipulation functions, mathematic functions, and the like. In addition, the libraries 1118 may include API libraries 1134 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1118 may also include a wide variety of other libraries 1136 to provide many other APIs to the applications 1120 and other software components/modules.

The frameworks 1116 (also sometimes referred to as middleware) may provide a higher-level common infrastructure that may be utilized by the applications 1120 or other software components/modules. For example, the frameworks 1116 may provide various graphic user interface (GUI) functions, high-level resource management, high-level location services, and so forth. The frameworks 1116 may provide a broad spectrum of other APIs that may be utilized by the applications 1120 and/or other software components/modules, some of which may be specific to a particular operating system or platform.

The applications 1120 include built-in applications 1138 and/or third-party applications 1140. Examples of representative built-in applications 1138 may include, but are not limited to, a home application, a contacts application, a browser application, a book reader application, a location application, a media application, a messaging application, or a game application.

The third-party applications 1140 may include any of the built-in applications 1138, as well as a broad assortment of other applications. In a specific example, the third-party applications 1140 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party applications 1140 may invoke the API calls 1122 provided by the mobile operating system such as the operating system 1114 to facilitate functionality described herein.

The applications 1120 may utilize built-in operating system functions (e.g., kernel 1128, services 1126, or drivers 1130), libraries (e.g., system libraries 1132, API libraries 1134, and other libraries 1136), or frameworks/middleware 1116 to create user interfaces to interact with users of the system. Alternatively, or additionally, in some systems, interactions with a user may occur through a presentation layer, such as the presentation layer 1142. In these systems, the application/module "logic" can be separated from the aspects of the application/module that interact with the user.

Some software architectures utilize virtual machines. In the example of FIG. 11, this is illustrated by a virtual machine 1146. A virtual machine creates a software environment where applications/modules can execute as if they were executing on a hardware machine e.g., the machine 1300 of FIG. 13, for example). A virtual machine 1146 is hosted by a host operating system (e.g., operating system 1114) and typically, although not always, has a virtual machine monitor 1144, which manages the operation of the virtual machine 1146 as well as the interface with the host operating system (e.g., operating system 1114). A software architecture executes within the virtual machine 1146, such as an operating system 1148, libraries 1156, frameworks/middleware 1154, applications 1152, or a presentation layer 1150. These layers of software architecture executing within the virtual machine 1146 can be the same as corresponding layers previously described or may be different.

Figure 12:
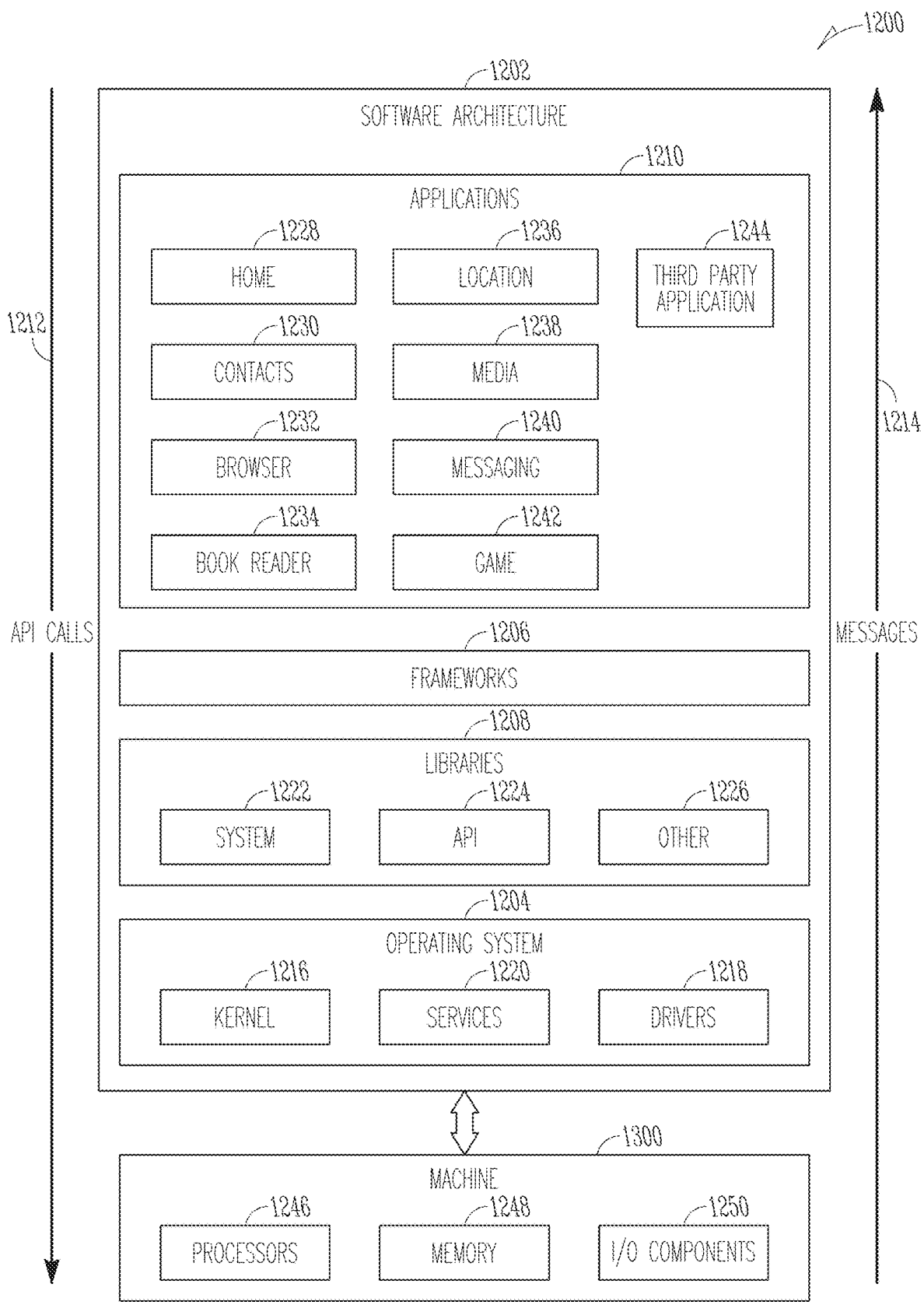
FIG. 12 depicts a block diagram illustrating an architecture of software, according to an example embodiment

FIG. 12 is a block diagram 1200 illustrating an architecture of software 1202, which can be installed on any one or more of the devices described above. FIG. 12 is merely a non-limiting example of a software architecture, and it will be appreciated that many other architectures can be implemented to facilitate the functionality described herein. In various embodiments, the software 1202 is implemented by hardware such as a machine 1300 of FIG. 13 that includes processor(s) 1246, memory 1248, and input/output (I/O) components 1250. In this example architecture, the software 1202 can be conceptualized as a stack of layers where each layer may provide a particular functionality. For example, the software 1202 includes layers such as an operating system 1204, libraries 1208, frameworks 1206, and applications 1210. Operationally, the applications 1210 invoke API calls 1212 (application programming interface) through the software stack and receive messages 1214 in response to the API calls 1212, consistent with some embodiments.

In various implementations, the operating system 1204 manages hardware resources and provides common services. The operating system 1004 includes, for example, a kernel 1216, services 1220, and drivers 1218. The kernel 1216 acts as an abstraction layer between the hardware and the other software layers, consistent with some embodiments. For example, the kernel 1216 provides memory management, processor management (e.g., scheduling), component management, networking, and security settings, among other functionality. The services 1220 can provide other common services for the other software layers. The drivers 1218 are responsible for controlling or interfacing with the underlying hardware, according to some embodiments. For instance, the drivers 1218 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

In some embodiments, the libraries 1208 provide a low-level common infrastructure utilized by the applications 1210. The libraries 1208 can include system libraries 1222 (e.g., C standard library) that can provide functions such as memory allocation functions, string manipulation functions, mathematic functions, and the like. In addition, the libraries 1208 can include API libraries 1224 such as media libraries (e.g., libraries to support presentation and manipulation of various media formats such as MPEG4, H.264 or AVC, MP3, AAC, AMR audio codec, JPEG or JPG, or PNG), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1208 can also include a wide variety of other libraries 1226 to provide many other APIs to the applications 1210.

The frameworks 1206 provide a high-level common infrastructure that can be utilized by the applications 1210, according to some embodiments. For example, the frameworks 1206 provide various GUI functions, high-level resource management, high-level location services, and so forth. The frameworks 1206 can provide a broad spectrum of other APIs that can be utilized by the applications 1210, some of which may be specific to a particular operating system or platform.

In an example embodiment, the applications 1210 include a home application 1228, a contacts application 1230, a browser application 1232, a book reader application 1234, a location application 1236, a media application 1238, a messaging application 1240, a game application 1242, and a broad assortment of other applications, such as a third-party application 1244. According to some embodiments, the applications 1210 are programs that execute functions defined in the programs. Various programming languages can be employed to create one or more of the applications 1210, structured in a variety of manners, such as object-oriented programming languages (e.g., Objective-C, Java, or C++) or procedural programming languages (e.g., C or assembly language). In a specific example, the third-party application 1244 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1244 can invoke the API calls 1212 provided by the operating system 1204 to facilitate functionality described herein.

FIG. 13 illustrates a diagrammatic representation of a machine 1300 in the form of a computer system within which a set of instructions may be executed for causing the machine to perform any one or more of the methodologies discussed herein, according to an example embodiment. Specifically, FIG. 13 shows a diagrammatic representation of the machine 1300 in the example form of a computer system, within which instructions 1306 (e.g., software, a program, an application, an applet, an app, or other executable code) for causing the machine 1300 to perform any one or more of the methodologies discussed herein may be executed. Additionally, or alternatively, the instructions 1306 may implement the operations of the methods summarized or described herein.

The instructions 1306 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1306, sequentially or otherwise, that specify actions to be taken by the machine 1300. Further, while only a single machine 1300 is illustrated, the term "machine" shall also be taken to include a collection of machines 1300 that individually or jointly execute the instructions 1306 to perform any one or more of the methodologies discussed herein.

The machine 1300 may include processor(s) 1246, memory 1248, and I/O components 1250, which may be configured to communicate with each other such as via a bus 1302. In an example embodiment, the processor(s) 1246 (e.g., a CPU, a Reduced Instruction Set Computing (RISC) processor, a Complex Instruction Set Computing (CISC) processor, a GPU, a Digital Signal Processor (DSP), an ASIC, a Radio-Frequency Integrated Circuit (RFIC), another processor, or any suitable combination thereof) may include, for example, a processor 1304 and a processor 1308 that may execute the instructions 1306. The term "processor" is intended to include multi-core processors that may comprise two or more independent processors (sometimes referred to as "cores") that may execute instructions contemporaneously. Although FIG. 13 shows multiple processor(s) 1246, the machine 1300 may include a single processor with a single core, a single processor with multiple cores (e.g., a multi-core processor), multiple processors with a single core, multiple processors with multiples cores, or any combination thereof.

The memory 1248 may include a main memory 1312, a static memory 1310, and a storage unit 1316, each accessible to the processor(s) 1246 such as via the bus 1302. The main memory 1312, the static memory 1310, and storage unit 1316 store the instructions 1306 embodying any one or more of the methodologies or functions described herein. The instructions 1306 may also reside, completely or partially, within the main memory 1312, within the static memory 1310, within the storage unit 1316, within at least one of the processor(s) 1246 (e.g., within the processor's cache memory), or any suitable combination thereof, during execution thereof by the machine 1300.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 13. The I/O components 1250 are grouped according to functionality merely for simplifying the following discussion and the grouping is in no way limiting. In various example embodiments, the I/O components 1250 may include output components 1320 and input components 1322. The output components 1320 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1322 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1324, motion components 1326, environmental components 1328, or position components 1330, among a wide array of other components. For example, the biometric components 1324 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1326 may include acceleration sensor components (e.g., accelerometer), gravitation sensor components, rotation sensor components (e.g., gyroscope), and so forth. The environmental components 1328 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1330 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1334 operable to couple the machine 1300 to a network 1338 or devices 1332 via a coupling 1314 and a coupling 1336, respectively. For example, the communication components 1334 may include a network interface component or another suitable device to interface with the network 1338. In further examples, the communication components 1334 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1332 may be another machine or any of a wide variety of peripheral devices (e.g., a peripheral device coupled via a USB).

Moreover, the communication components 1334 may detect identifiers or include components operable to detect identifiers. For example, the communication components 1334 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals).

In addition, a variety of information may be derived via the communication components 1334, such as location via IP geolocation, location via Wi-Fi® signal triangulation, location via detecting an NFC beacon signal that may indicate a particular location, and so forth.

The various memories (i.e., memory 1248, main memory 1312, and/or static memory 1310) and/or storage unit 1316 may store one or more sets of instructions and data structures (e.g., software) embodying or utilized by any one or more of the methodologies or functions described herein. These instructions (e.g., the instructions 1306), when executed by processor(s) 1246, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. In some examples, a storage device or medium accepts or receives random writes The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1338 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1338 or a portion of the network 1338 may include a wireless or cellular network, and the coupling 1314 may be a Code Division Multiple Access (CDMA) connection, a Global System for Mobile communications (GSM) connection, or another type of cellular or wireless coupling. In this example, the coupling 1314 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1306 may be transmitted or received over the network 1338 using a transmission medium via a network interface device (e.g., a network interface component included in the communication components 1334) and utilizing any one of a number of well-known transfer protocols (e.g., hypertext transfer protocol (HTTP)). Similarly, the instructions 1306 may be transmitted or received using a transmission medium via the coupling 1336 (e.g., a peer-to-peer coupling) to the devices 1332. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1306 for execution by the machine 1300, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals. In some examples, the storage devices/media accept or receiving random writes.

Although examples have been described with reference to specific example embodiments or methods, it will be evident that various modifications and changes may be made to these embodiments without departing from the broader scope of the embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of creating a consolidated patch file, the method comprising:
scanning, by at least one processor of a data management and storage (DMS) platform, one or more index blocks in one or more cloud patch files to identify data blocks from the one or more cloud patch files, the data blocks associated with a recovery of a virtual machine to a first point in time state of the virtual machine, wherein the one or more cloud patch files are stored in cloud storage, wherein the one or more cloud patch files correspond to one or more respective snapshots of the virtual machine at one or more respective points in time, and wherein at least one of the one or more respective snapshots is an incremental snapshot;

downloading, by the at least one processor and from the one or more cloud patch files, at least some of the data blocks identified by the scanning of the one or more index blocks in the one or more cloud patch files; and creating, by the at least one processor, the consolidated patch file using the data blocks downloaded from the cloud storage.

2. The method of claim 1, further comprising:

using, by the at least one processor, the consolidated patch file to perform a restore of the virtual machine to the first point in time state at a server.

3. The method of claim 1, further comprising:

creating a patch file image that identifies the data blocks from the one or more cloud patch files, wherein the downloading the at least some of the data blocks is based at least in part on the patch file image.

4. The method of claim 3, wherein the patch file image includes information concerning a cloud patch file path, a cloud patch file offset, a cloud patch file size, or any combination thereof.

5. The method of claim 4, wherein a file size of the patch file image is smaller than each respective file size of the one or more cloud patch files.

6. The method of claim 1, further comprising:

identifying, by the at least one processor, the at least some of the data blocks for downloading simultaneously, wherein the at least some of the data blocks are downloaded simultaneously.

7. The method of claim 1, wherein the at least some of the data blocks comprise a set of contiguous data blocks from a same cloud patch file of the one or more cloud patch files.

8. The method of claim 1, further comprising:

storing, by the at least one processor, the consolidated patch file in local storage associated with the at least one processor.

9. The method of claim 1, wherein downloading at least some of the data blocks comprises:

downloading, by the at least one processor and based at least in part on the scanning, a first set of data blocks from a first cloud patch file of the one or more cloud patch files in parallel with a second set of data blocks from a second cloud patch file of the one or more cloud patch files.

10. A data management and storage (DMS) platform, comprising:

at least one processor configured to perform operations comprising:

scanning, by the at least one processor, one or more index blocks in one or more cloud patch files to identify data blocks from the one or more cloud patch files, the data blocks associated with a recovery of a virtual machine to a first point in time state of the virtual machine, wherein the one or more cloud patch files are stored in cloud storage, wherein the one or more cloud patch files correspond to one or more respective snapshots of the virtual machine at one or more respective points in time, and wherein at least one of the one or more respective snapshots is an incremental snapshot;

downloading, by the at least one processor and from the one or more cloud patch files, at least some of the data blocks identified by the scanning of the one or more index blocks in the one or more cloud patch files; and creating, by the at least one processor, a consolidated patch file using the data blocks downloaded from the cloud storage.

11. The DMS platform of claim 10, wherein the operations further comprise:

using, by the at least one processor, the consolidated patch file to perform a restore of the virtual machine to the first point in time state at a server.

12. The DMS platform of claim 10, wherein the operations further comprise:

creating a patch file image that identifies the data blocks from the one or more cloud patch files, wherein the downloading the at least some of the data blocks is based at least in part on the patch file image.

13. The DMS platform of claim 12, wherein the patch file image includes information concerning a cloud patch file path, a cloud patch file offset, a cloud patch file size, or any combination thereof.

14. The DMS platform of claim 13, wherein a file size of the patch file image is smaller than each respective file size of the one or more cloud patch files.

15. The DMS platform of claim 10, wherein the operations further comprise:

identifying, by the at least one processor, the at least some of the data blocks for downloading simultaneously, wherein the at least some of the data blocks are downloaded simultaneously.

16. The DMS platform of claim 10, wherein the at least some of the data blocks comprise a set of contiguous data blocks from a same cloud patch file of the one or more cloud patch files.

17. The DMS platform of claim 10, wherein the operations further comprise:

storing, by the at least one processor, the consolidated patch file in local storage associated with the at least one processor.

18. A non-transitory machine-readable medium comprising instructions executable by at least one processor to implement operations comprising:

scanning, by the at least one processor, one or more index blocks in one or more cloud patch files to identify data blocks from the one or more cloud patch files, the data blocks associated with a recovery of a virtual machine to a first point in time state of the virtual machine, wherein the one or more cloud patch files are stored in cloud storage, wherein the one or more cloud patch files correspond to one or more respective snapshots of the virtual machine at one or more respective points in time, and wherein at least one of the one or more respective snapshots is an incremental snapshot;

downloading, by the at least one processor and from the one or more cloud patch files, at least some of the data blocks identified by the scanning of the one or more index blocks in the one or more cloud patch files; and creating, by the at least one processor, a consolidated patch file using the data blocks downloaded from the cloud storage.

19. The non-transitory machine-readable medium of claim 18, wherein the operations further comprise:

using, by the at least one processor, the consolidated patch file to perform a restore of the virtual machine to the first point in time state at a server.

20. The non-transitory machine-readable medium of claim 18, wherein the operations further comprise:
creating a patch file image that identifies the data blocks from the one or more cloud patch files, wherein the downloading the at least some of the data blocks is based at least in part on the patch file image.

* * * * *